May 16, 1961　　　M. B. CONRAD　　　2,984,451
SUBSURFACE VALVE APPARATUS
Filed April 21, 1958　　　　　　2 Sheets-Sheet 1
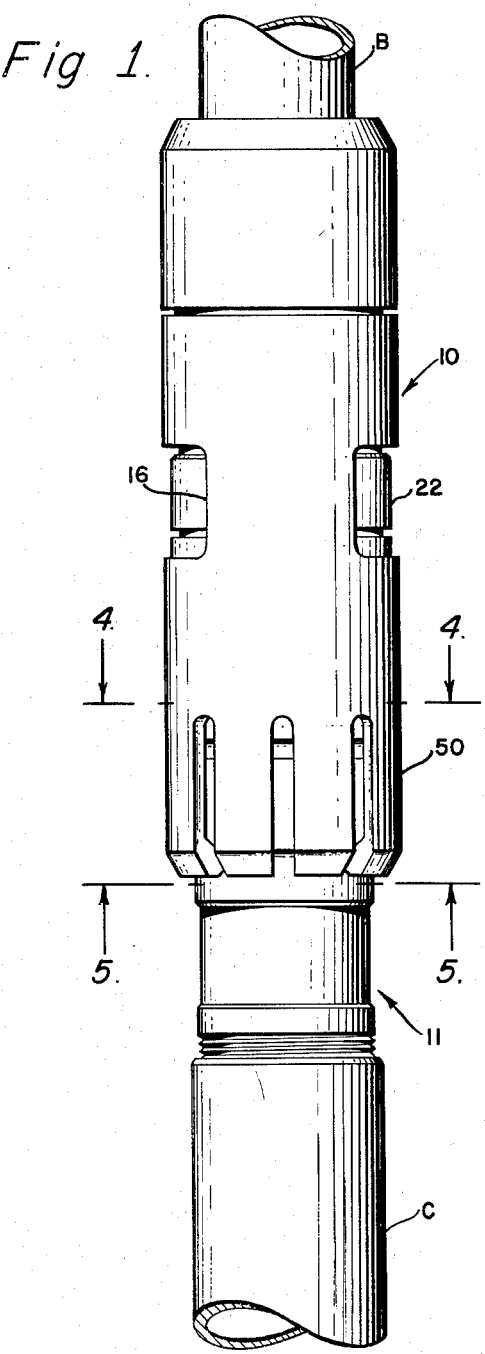
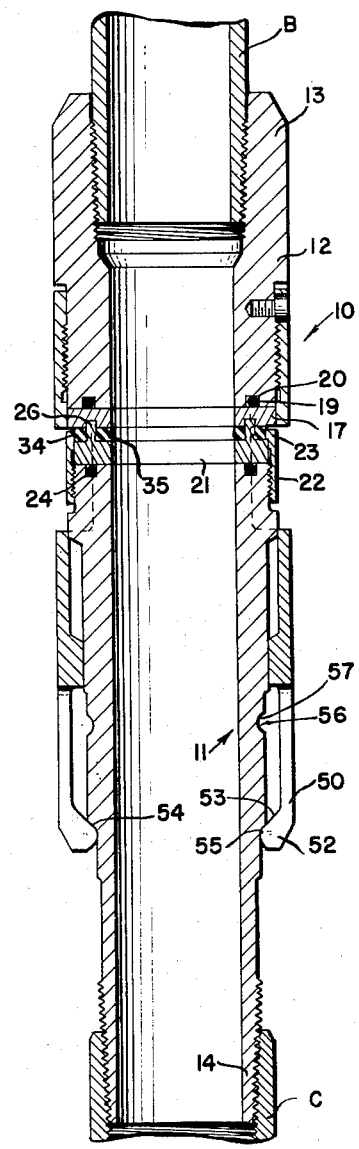
Martin B. Conrad,
INVENTOR.
BY
ATTORNEYS May 16, 1961  M. B. CONRAD  2,984,451
SUBSURFACE VALVE APPARATUS
Filed April 21, 1958  2 Sheets-Sheet 2
Fig. 3
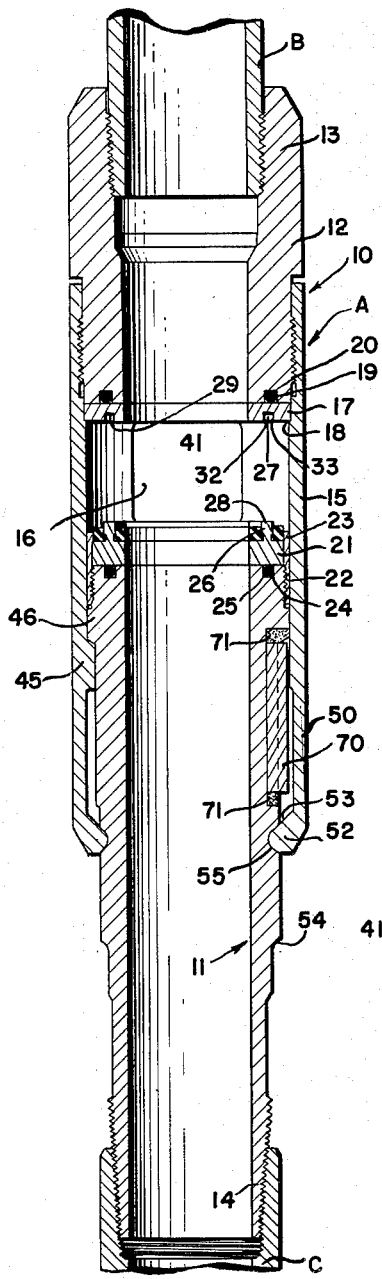
Fig. 4
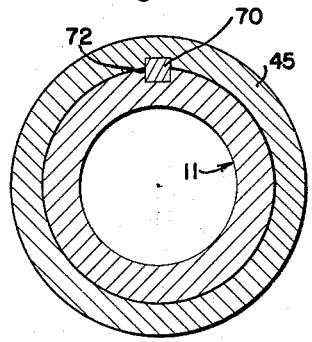
Fig. 5
Fig. 6  Fig. 7
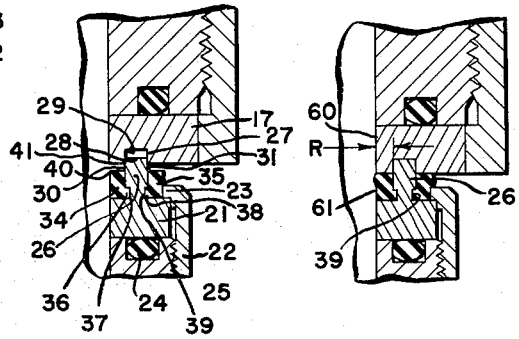
Martin B. Conrad,
INVENTOR.
BY
Mellin and Hanscom
ATTORNEYS

United States Patent Office 2,984,451
Patented May 16, 1961

2,984,451
SUBSURFACE VALVE APPARATUS

Martin B. Conrad, Downey, Calif., assignor to Baker Oil Tools, Inc., Los Angeles, Calif., a corporation of California Filed Apr. 21, 1958, Ser. No. 729,972

10 Claims. (Cl. 251—210)

The present invention relates to valve apparatus, and more particularly to valve apparatus adapted to be used in a well bore in conjunction with a tubular string disposed therein.

An object of the invention is to provide a subsurface valve apparatus adapted to control flow of fluid between its interior and exterior, and incorporating pliant, elastic seal rings, such as rubber or rubber-like rings, that are not forced or blown from their appropriate position in the apparatus when subjected to high pressure differentials. The seal rings remain intact while the valve apparatus is opened or closed, or moved between open and closed positions, and despite the presence of the high pressure differentials internally of the apparatus or externally thereof.

Another object of the invention is to provide a subsurface valve apparatus embodying telescopically arranged tubular members in which the tendency of fluid pressure differentials within or externally of the members to shift the valve to open position is greatly minimized.

A further object of the invention is to provide a subsurface valve apparatus embodying a pliant, elastic seal member which is subject to axial compression in closing the valve and preventing leakage, such pliant, elastic seal member being supplemented by a metal-to-metal seal which limits the amount of mechanical compression that can be placed on the elastic seal member.

An additional object of the invention is to provide a subsurface valve apparatus embodying a pliant, elastic seal member which is subject to axial compression in closing the valve and preventing leakage, such pliant, elastic seal member being supplemented by a metal-to-metal end seal which is also responsive to fluid pressure to provide a metal-to-metal side seal as well. In a more limiting sense, metal-to-metal seals, both end and side, are present with the pressure differential internally of the apparatus or externally thereof.

Yet another object of the invention is to provide a subsurface valve apparatus embodying telescopically arranged tubular members having a side opening or openings through which fluid can flow between the interior and exterior of the members when the valve apparatus is in open condition, the flow of fluid through said opening or openings between the interior and exterior of the members being unimpeded and direct, thereby minimizing fluid erosion of the valve apparatus parts and resulting in a long, useful life of the valve apparatus.

Still a further object of the invention is to provide a subsurface valve apparatus embodying telescopically arranged tubular members, which is economical to manufacture, short, compact, easy to maintain, and in which replacement of seal rings and other seal parts is low, and when necessary, is relatively easy to perform.

This invention possesses many other advantages, and has other objects which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claims.

Referring to the drawings:

Figure 1 is a side elevation of an apparatus embodying the invention;

Fig. 2 is a longitudinal section through the apparatus, the valve being shown in closed position;

Fig. 3 is a view similar to Fig. 2 illustrating the valve in open position;

Fig. 4 is a cross-section taken along the line 4—4 on Fig. 1;

Fig. 5 is a cross-section taken along the line 5—5 on Fig. 1;

Fig. 6 is an enlarged fragmentary longitudinal section through the head and valve seat portion of the apparatus;

Fig. 7 is a view similar to Fig. 6, the valve being fully closed.

The valve apparatus A shown in the drawings is specifically designed for use in a well bore to control flow of fluid between the interior and the exterior of a tubular string B, such as drill pipe or tubing, extending to the top of the hole. The valve apparatus may be used in conjunction with a lower well tool C, of which only the body or mandrel portion is disclosed, this lower well tool being of the type that can be anchored to a well casing against longitudinal movement therein, the casing being disposed in the well bore.

The valve apparatus A includes an outer housing or outer tubular member 10 telescopically arranged with respect to an inner tubular member or mandrel 11. The housing may be secured to the tubular string B and the mandrel to the lower well tool C, or the apparatus can be inverted with the mandrel secured to the tubular string and the housing to the well tool. As shown, the outer tubular member 10 includes an upper housing section or sub 12 provided with an upper threaded box 13 for threaded attachment to the tubular string B. The inner tubular member 11 may have a threaded pin 14 thereon for threaded attachment to the lower tool body or mandrel C. The outer tubular member 10 also includes a lower housing section 15 which is threadedly secured to the upper housing section 12 and is slidable along the periphery of the inner tubular member or mandrel 11. This lower housing section has one or a plurality of side openings or ports 16 through its wall and below the lower end of the upper housing section or sub 12, to permit fluid to pass between the interior and the exterior of the valve apparatus when it is in open condition. These side openings or ports 16 may be made quite large, their large area allowing relatively unimpeded fluid flow between the interior and exterior of the valve apparatus when in its fully open condition.

The valve apparatus includes a valve seat 17 on the lower end of the upper housing section 12, which is preferably constituted as a separate part for ease and economy of replacement in the event it becomes worn. This valve seat 17 is clamped against the lower end of the upper housing section by a shoulder 18 on the lower housing section 15 engaging the lower outer portion of the valve seat. Leakage of fluid between the upper end of the valve seat 17 and the lower end of the sub 12 is prevented by a suitable gasket or seal ring 19, such as a rubber or rubber-like O ring, mounted in an annular or end groove 20 in the lower end of the housing and sealingly engaging the upper end of the valve seat.

Mounted on the upper end of the inner tubular member 11, and preferably made separate therefrom, is a metallic valve head 21, the lower end of which is clamped against the upper end of the inner tubular member 11 by a nut 22 threaded on the mandrel 11 and having an upper inwardly directed flange 23 engaging an upper outer surface of the metallic valve head. Leakage of fluid between the lower end of the valve head 21 and the upper end of the inner tubular member 11 is prevented by a suitable seal ring gasket 24, in the form of a rubber or rubber-like O-ring, disposed in an annular end groove 25 in the upper end of the inner tubular member 11 and sealingly engaging the lower end of the valve head.

The valve head 21 has an upwardly extending annular projection 26 integral therewith adapted to closely fit within an opposed downwardly opening annular end groove 27 in the valve seat 17, with the upper end 28 of the projection engaging the base 29 of the groove when the valve is in closed position. The inner surface 30 of the projection 26 and its outer surface 31 preferably make a fairly close sliding fit with the inner and outer side walls 32, 33 of the groove 27 for a purpose that will appear hereinafter.

Mounted on the valve head 21 are inner and outer seal rings 34, 35, the inner seal ring 34 being disposed within the confines of the projection 26 and engaging its inner side surface 30, this seal ring having a lower outwardly directed flange 36 disposed within a companion internal groove 37 in the projection. The outer seal ring 35 engages the outer side wall or surface 31 of the projection and has an inwardly directed flange 38 received within a companion groove 39 in the projection. Actually, the inner and outer seal rings 34, 35, which may be made of rubber or rubber-like material, are molded to the valve head 21 and in the grooves 37, 39, the inside diameter of the inner seal ring 34 being substantially equal to inside diameter of the valve head 21, outer ends 40 of both seal rings terminating below and inwardly of the upper or outer end 28 of the projection 26. The parts are so proportioned that the ends 40 of the inner and outer seal rings engage the end face 41 of the valve seat and are compressed to some extent thereagainst before the end 28 of the projection 26 engages the base 29 of the annular groove in the valve seat 17.

It is to be noted that the inside diameter of the upper sub 12, valve seat 17, valve head 21, inner seal ring 34, and inner tubular member 11 are preferably substantially the same, so that there is an unobstructed continuous inner wall provided when the valve is in closed position for the passage of fluid through the valve apparatus. This inside diameter is preferably no less than the inside diameter through the tubing string B, presenting no restrictions in the valve device to the flow of fluent material therethrough, or to the passage of objects, such as perforating guns and the like, therethrough, which may be used below the valve apparatus and then withdrawn through it.

The valve is in the closed position when the inner and outer tubular members 11, 10 occupy a contracted position relative to one another, with the inner and outer seal rings 34, 35 engaging the valve seat 17 and the valve head projection 26 disposed fully within the annular groove 27 and in engagement with the base 29 of the groove. The valve member is placed in an open position upon relative extending of the inner and outer tubular members 11, 10 with respect to one another. Thus, the outer tubular member 10 is elevated with respect to the inner tubular member 11 to remove the valve head 21 and seal rings 34, 35 from the companion valve seat 17 and to elevate the side openings or ports 16 almost completely above the valve head 21 and seal rings 34, 35, there then being large openings 16 through the apparatus permitting flow of fluid between the interior and exterior thereof, such as disclosed in Fig. 3. Such open position of the valve is determined by engagement of an inwardly directed stop shoulder 45 on the lower housing section 15 with a companion stop shoulder 46 thereabove projecting outwardly from the inner tubular member 11.

In the form of the invention disclosed in the drawings, the valve apparatus is preferably releasably retained in the closed position and also releasably retained in the open position, there being a substantial longitudinal force required to shift the valve between such positions. The releasable retention is secured in the present instance by means of a releasable latch device provided between the inner and outer tubular members 11, 10. Thus, the outer tubular member, or its lower housing section 15, has a plurality of depending legs 50 integral therewith below the inwardly directed flange 45. These depending legs may be formed by providing circumferentially spaced slots 51 through the lower housing section 15 extending from its lower end to the flange 45. The legs 50 terminate in inwardly directed foot portions 52 having upper cam surfaces 53 inclined in a downward and inward direction for engagement with a companion lower cam shoulder or inclined surface 54 on the mandrel 11. When so engaged, the valve is releasably retained in the closed position shown in Figs. 1 and 2. The foot portions 52 also have lower inclined cam surfaces 55 that taper in an upward and inward direction for engagement with a companion tapered cam surface 56 formed on the mandrel 11 as the lower side of a circumferential groove 57 an appropriate distance above the lower cam shoulder or surface 54. When the feet 52 are disposed in such groove 57, the valve is in the open position, as illustrated in Fig. 3.

Assuming the valve to be in the closed position shown in Figs. 1 and 2, with the latch feet 52 engaged under the lower cam shoulder 54 on the mandrel 11, the valve can only be shifted to an open position by overcoming the inherent spring force of the legs 50; that is, by expanding the legs outwardly. The taking of a sufficient upward pull on the tubular string B and the outer tubular member 10, with the inner tubular member 11 held stationary by the anchoring of the lower tool C to the well casing, will cause the inclined cam surface 54 to expand and cam the foot portions 52 outwardly sufficiently until the foot portions are no longer disposed under the shoulder 54, whereupon the foot portions 52 can slide along the periphery of the mandrel 11, the outer housing member 10 then moving upwardly relative to the inner mandrel to elevate the valve seat 17 from the head 21 and dispose the ports 16 almost fully above the valve head 21 and its seal rings 34, 35. This upward position is limited by the coengagement of the stop shoulders 45, 46, at which time the feet 52 will shift inherently into the upper mandrel groove 57, releasably retaining the valve in the open position.

If it is desired to reclose the valve, then a sufficient downward force is imposed through the tubular string B on the outer tubular member 10, the inner tubular member 11 being prevented from moving longitudinally by the anchoring of the lower tool C against the well casing, the coengaging cam surfaces 55, 56 expanding the feet 52 and legs 50 outwardly from the groove 57, whereupon the legs can slide down along the peripheral surface of the mandrel 11 once again, until the valve seat 17 receives the head projection 26 and the inner and outer seal rings 34, 35 again are in sealing engagement with the valve seat. At this time, the feet 52 can retract inherently to a position under the lower cam surface or shoulder 54 on the mandrel 11, releasably holding the valve in closed position.

The force required to shift the legs 50 from engagement with the lower and upper shoulders 54, 56 can be quite substantial. For example, a total upward pull or downward force of 3000 lbs. might be necessary to release the legs from the lower shoulder 54 or to release them from the upper cam surface 56, depending upon the open or closed condition of the valve.

The valve apparatus is capable of withstanding relatively high pressure differentials internally of the apparatus and also relatively high pressure differentials externally of the apparatus without the pliant, elastic seal rings 34, 35 being blown out or forced out of their assembled position on the apparatus when the valve is being moved to an open condition or to a closed condition. It is to be noted that when the valve is in the closed condition, the head projection 26 is disposed fully within the groove 27, with its end 28 in contact with the base 29 of the valve seat groove. Assuming a pressure differential to be present internally of the tubular members 10, 11, such pressure is acting in an outward direction against the inner seal ring 34, forcing it outwardly against the inner side 30 of the projection 26 and also against the lower face 41 of the valve seat 17. The seal ring 34 cannot be displaced from its assembled relation since the clearance space between the projection 26 and the inner side 32 of the valve seat groove 27 is very small; in fact being so small that none of the seal ring material can be forced into such space. A firm elastic seal is thus provided between the valve head 21 and the valve seat 17, preventing leakage. This seal is supplemented by the metal-to-metal contact between the end 28 of the projection and the base 29 of the groove 27, that forms another valve seating surface. Thus, there are two main sealing regions preventing leakage of fluid from the interior of the apparatus to the exterior, one of which is provided by the sealing engagement of the inner seal ring 34 with the face 41 of the valve seat 17, and the other provided by the metallic sealing engagement of the end 28 of the head projection 26 with the base 29 of the valve seat groove 27.

There is yet a further metal-to-metal sealing surface provided between the projection 26 and the valve seat 17. In the event of comparatively high pressure differentials internally of the apparatus, such pressures are acting outwardly on the inner seal ring 34 and are exerted through such inner seal ring in an outward direction upon the projection 26, deforming such projection to a slight extent, which is sufficient to engage the outer side 31 of the projection with the outer side wall 33 of the valve seat groove 27, holding them in firm sealing contact with one another, and thus providing a metal-to-metal side seal between the head projection and the valve seat.

With a pressure differential internally of the apparatus, if the valve is to be opened, such opening will occur without blowing or forcing the inner seal ring 34 out of its assembled relation on the valve head. As the outer tubular member 10 is moved upwardly relative to the inner tubular member 11, the inner seal ring 34 will disengage from the end face 41 of the valve seat 17 before the projection 26 is removed from the end groove 27 of the valve seat (Fig. 6). Thus, during the time that the inner seal ring 34 is being moved to a disengaged position from the end face 41 of the valve seat, it is being backed up by the projection 26, which is still making a close fit with the inner side 32 of the valve seat groove 27. After the inner seal ring 34 disengages from the valve seat 17, but before the projection 26 moves out of the groove 27, the internal pressure is being applied to the seal ring 34 on both its inner and outer sides, the inner seal ring then having no pressure differential applied to it. Thereafter, the projection 26 will move out of the seat groove 27 and allow fluid to flow therearound. At this time, the inner and outer seal rings 34, 35 have been substantially removed from the face 41 of the valve seat 17 and are subjected to substantially no pressure differentials. The valve can then be shifted completely to its fully open position.

Assuming the valve to be in the closed position shown in Fig. 2, and a comparatively high pressure differential present externally of the device, the valve is held in the closed position without fear that the outer seal ring 35 will be removed from its appropriate position on the valve head 21 and in sealing engagement with the end face 41 of the valve seat 17. The pressure is exerted inwardly on the outer seal ring 35. Such pressure cannot force the ring 35 into the small clearance space existing between the outer surface 31 of the projection and the outer side wall 33 of the valve seat groove 27, as was true of the inner seal ring. The sealing action of the outer seal ring 35 against the end face 41 of the valve seat is supplemented by a metal-to-metal end seal provided between the end face 28 of the projection and the base 29 of the valve seat groove. Under rather high pressure differential conditions, the inward force exerted on the outer seal ring 35 is transferred therethrough to the projection 26, deforming or urging it inwardly so that its inner side surface 30 engages the inner side wall 32 of the groove 27, thereby providing an additional side metal-to-metal seal, or a total of three seals precluding leakage of fluid through the closed and engaged valve elements.

In the event the valve is to be shifted to open position with a relatively high pressure differential externally of the apparatus, the elevation of the outer tubular member 10 relative to the inner tubular member 11 will first move the valve seat 17 upwardly to disengage its end face 41 from the end of the outer seal ring 35, at which time the projection 26 is still disposed within the valve seat groove 27 (Fig. 6). The external pressure will become equalized around the outer seal ring 35 before the backing afforded by the projection 26 within the valve seat groove 27 becomes non-existent. Thereafter, the elevation of the valve seat 17 completely from the projection 26 can occur without any of the pliant, elastic sealing elements being subject to high pressure differentials tending to blow or force them out of their assembled position on the valve head, the valve being shifted to its fully open position, such as shown in Fig. 3.

With the valve in the open condition, it can be shifted to the closed position once again without fear of forcing or extruding the inner and outer seal rings 34, 35 from their assembled position. Each seal ring will have no pressure differential imposed upon it until after the projection 26 enters the annular end groove 27 in the valve seat 17; whereupon any pressure differential imposed on the inner ring 34, in the event the internal pressure predominates, will force the inner ring outwardly against the projection 26, which is making a close sliding fit with the inner side wall 32 of the groove, allowing no space through which the packing material can be extruded. A complete closing of the valve will then shift the inner and outer seal rings 34, 35 into sealing engagement with the end face 41 of the valve seat to the extent limited by engagement of the end 28 of the projection with the base 29 of the valve seat groove.

Similarly, if the valve is shifted to a closed position with the pressure differential predominating externally of the apparatus, the projection 26 will move into the groove 27 before the outer seal ring 35 engages the valve seat 17 and has a pressure differential imposed thereon. At this time, the pressure is urging the outer seal ring 35 inwardly, but it is fully backed up by the projection 26 disposed within the groove 27, the valve being moved to the fully closed position referred to above.

The valve arrangement illustrated has yet a further advantage. With the valve in the closed position and a pressure differential internally of the apparatus, only a small end area is available tending to shift the valve to an open position. Such end area at most will be the annular area R of the end face 41 of the valve seat 17 between the inner wall 60 of the valve seat and the inner side 32 of the valve seat groove 27. It is evident that the pressure acting over this relatively small annular area R will not exert a very great force tending to shift the valve to an open position. In fact, the force, even under high pressure conditions, could very well be less than the holding force of the latch legs 50 under the lower cam or holding surface 54 on the inner mandrel 11.

Similarly, any pressure differentials externally of the apparatus tending to shift the outer tubular member upwardly from its closed position can act only over a relatively small differential area because of the relative arrangement of the parts.

Assuming that the inner tubular member 11 is not held from longitudinal movement by the lower tool C, any internal pressure would still fail to shift the valve inadvertently from a closed to an open condition, since the internal pressure is acting over the end area R referred to above between the inner surface 61 of the seal ring 34 and the inner surface 30 of the projection 26, which is substantially the same as the end area of the mandrel 11 subject to fluid or of the lower tool C attached thereto over which the fluid pressure is acting in an upward direction. The two areas practically counterbalance one another. In the event the pressure differential exists externally of the apparatus and the lower tool C is not anchoring the mandrel 11 to the well casing, then the upwardly facing and the downwardly facing end areas of the mandrel 11 over which the external pressure is acting substantially counterbalance one another, there being substantially no pressure force tending to shift the mandrel in either an upward or a downward direction.

It is preferred to transmit turning effort or torque between the inner and outer tubular members 11, 10 for all relative telescopic positions therebetween. To accomplish this purpose, a longitudinally extending key 70 may be suitably secured, as by use of welding material 71, to the inner tubular member 11, this key having an extended length and being slidably received within a longitudinal groove 72 in the flange 45 of the outer tubular member 10. Thus, for all telescopic positions of the inner and outer tubular member 11, 10, turning effort can be transmitted from the outer tubular member 10, through its flange 45 and the longitudinally extending key 70 to the inner tubular member 11, this turning effort then being transferred to the lower tool C for suitable actuation thereof.

The valve apparatus disclosed is capable of withstanding very high pressure differentials without failure of its parts, despite repeated opening and closing of the apparatus under such high pressure differential conditions.

The apparatus is short and compact, is comparatively economical to manufacture, and easy to maintain. The sealing elements 34, 35 have a long life, which is also true of the other parts, the replacement rate of parts being relatively low. The fact that the side openings 16 in the valve have a large area and communicate directly with the interior of the valve apparatus, as well as with the exterior thereof, minimizes fluid erosion on the parts when the valve is in open position. When it is in closed position, there is a minimum of fluid erosion on the parts, inasmuch as there is a straight-through passage through the valve apparatus, as is evident from Fig. 2. The arrangement of the coengageable sealing portions of the apparatus are such that the rubber or rubber-like seal elements 34, 35 cannot be blown or otherwise removed from the valve apparatus under high pressure differential conditions and during opening and closing of the valve apparatus, regardless of the existence of the pressure differential internally of the apparatus or externally thereof. In fact, a plurality of seals are provided; pliant, elastic seals as well as metal-to-metal seals that supplement one another and assure against leakage of fluid through the apparatus. The arrangement is such that there is only a relatively small resultant or differential area in the valve apparatus subject to pressure differentials and tending to shift the apparatus from its closed to its open condition. Whatever resultant hydraulic forces are present tending to shift the valve from the closed condition are easily overcome by the releasable latch device, which can be devised to withstand substantial longitudinal forces prior to release. The force required depends upon the thickness, material, and number of the legs 50 and their foot portions 52, and the degree of inclination of the coengageable cam surfaces 53, 54.

The inventor claims:

1. In valve apparatus: an outer member; an inner member telescoped within said outer member; one of said members having a valve seat thereon provided with an end groove; the other of said members having a valve head thereon provided with a projection adapted to move into and out of said groove; pliant, elastic seal elements on said head on opposite sides of said projection adapted to engage said seat when said projection is disposed in said groove, said seal elements terminating short of the end of said projection; the outer end of said projection being adapted to engage the base of said groove to provide a seal therewith while said seal elements engage said seat.

2. In valve apparatus: a first member; a second member movable with respect to said first member; a valve seat on said first member and having a groove; a valve head on said second member having a projection adapted to move into and out of said groove to close and open the valve apparatus as said members are moved with respect to each other; pliant, elastic seal elements on said head on opposite sides of said projection adapted to engage said seat when said projection is disposed in said groove, said seal elements terminating short of the end of said projection; the outer end of said projection being adapted to engage the base of said groove to provide a seal therewith while said seal elements engage said seat.

3. In valve apparatus: a first member; a second member movable with respect to said first member; valve seat means on said first member and having a groove; valve head means on said second member having a projection adapted to move into and out of said groove to close and open the valve apparatus as said members are moved with respect to each other; pliant, elastic seal elements on one of said means engageable with the other of said means on opposite sides of said projection when said projection is disposed in said groove, said seal elements terminating short of the end of said projection; the outer end of said projection being adapted to engage the base of said groove to provide a seal therewith while said seal elements engage said seat.

4. In valve apparatus: a first member; a second member movable with respect to said first member; a valve seat on said first member and having a circumferential end groove; a valve head on said second member having a circumferential projection adapted to move into and out of said groove to close and open the valve apparatus as said members are moved with respect to each other; and pliant, elastic seal elements on said head on opposite sides of said projection adapted to engage said seat when said projection is disposed in said groove, said seal elements terminating short of the end of said projection; the outer end of said projection being adapted to engage the base of said groove to provide a seal therewith while said seal elements engage said seat.

5. In valve apparatus: an outer tubular member; an inner tubular member telescoped within said outer tubular member; a valve seat on one of said members having an end seating surface and a circumferential end groove opening into said surface; a valve head on the other of said members having a circumferential projection adapted to move into and out of said groove to close and open the valve apparatus as said members are moved telescopically with respect to each other; an inner pliant, elastic seal ring on said head engaging the inner side surface of said projection; an outer pliant, elastic seal ring on said head engaging the outer side surface of said projection; said seal rings terminating short of the end of said projection to engage said seating surface after said projection has entered said groove; the outer end of said projection being adapted to engage the base of said groove to provide a seal therewith while said seal rings engage said seating surface.

6. In valve apparatus: an outer tubular member having a longitudinal passage therethrough; an inner tubular member telescoped within said outer tubular member and having a longitudinal passage therethrough opening into said other passage; one of said members having a side opening communicable with said passages and through which fluid can flow between the interior and exterior of said tubular members when the valve apparatus is in open condition; a valve seat on one of said members having an end seating surface and a circumferential end groove opening into said surface; a valve head on the other of said members having a circumferential projection adapted to move into and out of said groove to close and open said side opening as said members are moved telescopically with respect to each other; said projection making a close sliding fit with the sides of said groove when disposed therein; an inner pliant, elastic seal ring on said head engaging the inner side surface of said projection; an outer pliant, elastic seal ring on said head engaging the outer side surface of said projection; said seal rings terminating short of the end of said projection to engage said seating surface after said projection has entered said groove.

7. In valve apparatus: an outer tubular member; an inner tubular member telescoped within said outer tubular member; one of said members having a side opening through which fluid can flow between the interior and exterior of said tubular members when the valve apparatus is in open condition; a valve seat on one of said members having an end seating surface and a circumferential end groove opening into said surface; a valve head on the other of said members having a circumferential projection adapted to move into and out of said groove to close and open said side opening as said members are moved telescopically with respect to each other; an inner pliant, elastic seal ring on said head engaging the inner side surface of said projection; an outer pliant, elastic seal ring on said head engaging the outer side surface of said projection; said seal rings terminating short of the end of said projection to engage said seating surface after said projection has entered said groove; the outer end of said projection being adapted to engage the base of said groove to provide a seal therewith while said seal rings engage said seating surface.

8. In valve apparatus: an outer tubular member; an inner tubular member telescoped within said outer tubular member; one of said members having a side opening through which fluid can flow between the interior and exterior of said tubular members when the valve apparatus is in open condition; a valve seat on one of said members having an end seating surface and a circumferential end groove opening into said surface, the sides of said groove lying on cylindrical surfaces; a valve head on the other of said members having a circumferential projection adapted to move into and out of said groove to close and open said side opening as said members are moved telescopically with respect to each other, the inner and outer sides of said projection lying on cylindrical surfaces and making a substantially close sliding fit with the sides of said groove when disposed therewithin; an inner pliant, elastic seal ring on said head engaging the inner side surface of said projection; an outer pliant, elastic seal ring on said head engaging the outer side surface of said projection; said seal rings terminating short of the end of said projection to engage said seating surface after said projection has entered said groove.

9. In valve apparatus: a first member; a second member movable with respect to said first member; a valve seat on said first member and having a circumferential end groove; a valve head on said second member having a circumferential projection adapted to move into and out of said groove to close and open the valve apparatus as said members are moved with respect to each other, said projection making a close sliding fit with the sides of said groove when disposed therein; pliant, elastic seal elements on said head on opposite sides of said projection adapted to engage said seat when said projection is disposed in said groove, said seal elements terminating short of the end of said projection; the outer end of said projection being adapted to engage the base of said groove to provide a seal therewith while said seal elements engage said seating surface.

10. In valve apparatus: an outer tubular member; an inner tubular member telescoped within said outer tubular member; one of said members having a side opening through which fluid can flow between the interior and exterior of said tubular members when the valve apparatus is in open condition; a valve seat on one of said members having an end seating surface and a circumferential end groove opening into said surface, the sides of said groove lying on cylindrical surfaces; a valve head on the other of said members having a circumferential projection adapted to move into and out of said groove to close and open said side opening as said members are moved telescopically with respect to each other, the inner and outer sides of said projection lying on cylindrical surfaces and making a substantially close sliding fit with the sides of said groove when disposed therewithin; an inner pliant, elastic seal ring on said head engaging the inner side surface of said projection; an outer pliant, elastic seal ring on said head engaging the outer side surface of said projection; said seal rings terminating short of the end of said projection to engage said seating surface after said projection has entered said groove; the outer end of said projection being adapted to engage the base of said groove to provide a seal therewith while said seal rings engage said seating surface.

References Cited in the file of this patent

UNITED STATES PATENTS

| | | |
|---|---|---|
| 1,218,030 | Witmer | Mar. 6, 1917 |
| 1,690,183 | Stoughton | Nov. 6, 1928 |
| 2,124,155 | Thaete | July 19, 1938 |
| 2,591,514 | Courtot | Apr. 1, 1952 |
| 2,690,895 | Barcus | Oct. 5, 1954 |
| 2,815,187 | Hamer | Dec. 3, 1957 |
| 2,847,182 | Mancusi | Aug. 12, 1958 |

FOREIGN PATENTS

| | | |
|---|---|---|
| 59,843 | Norway | of 1938 |